March 14, 1933.  J. H. ASHBAUGH  1,901,621
REGULATOR SYSTEM
Filed July 30, 1930
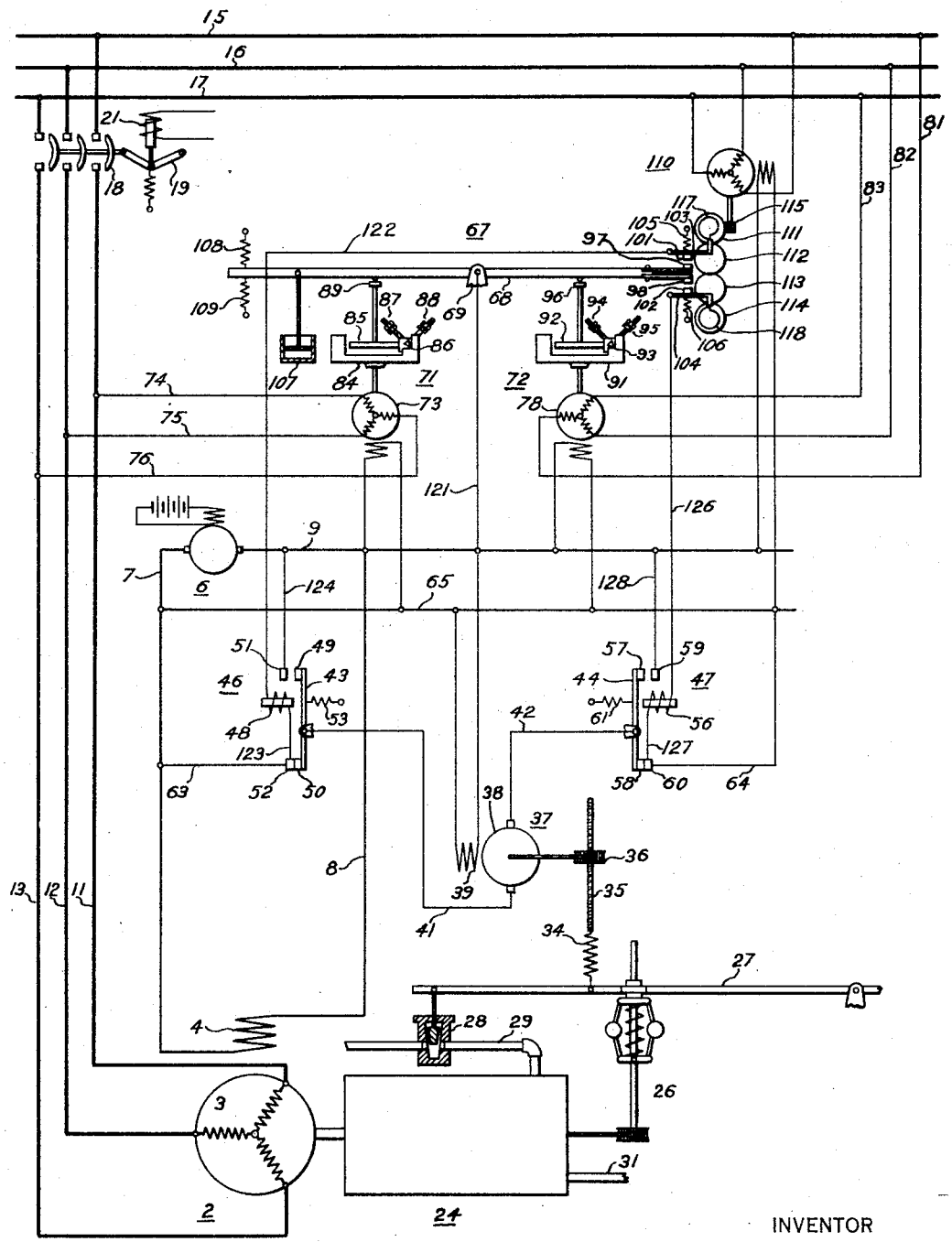
INVENTOR
John H. Ashbaugh
BY
ATTORNEY Patented Mar. 14, 1933

1,901,621

UNITED STATES PATENT OFFICE

JOHN H. ASHBAUGH, OF PITTSBURGH, PENNSYLVANIA, ASSIGNOR TO WESTINGHOUSE ELECTRIC & MANUFACTURING COMPANY, A CORPORATION OF PENNSYLVANIA

REGULATOR SYSTEM

Application filed July 30, 1930. Serial No. 471,672.

My invention relates to speed-regulator systems and it has particular relation to regulator systems for governing the speeds of dynamo-electric machines.

In many applications, it is desirable, and in many cases necessary, to have the speed of one dynamo-electric machine the same as that of another dynamo-electric machine or the same as the speed of a speed reference means. For example, when an electric generator is to be connected to a power system, it is necessary to have the speed of the generator such that the frequency of the generated voltage is in synchronism with the system frequency before connecting the generator to the system. It is frequently desirable to match the speed of the incoming machine with the system automatically, as is the case in automatic stations where attendants are unavailable.

One object of my invention is to provide a speed-matching system that shall be accurate and reliable in operation.

Another object of my invention is the provision of means whereby the speed of a dynamo-electric machine shall be automatically matched with a speed-reference means.

Another object of my invention is the provision of means whereby the speed of a dynamo-electric machine shall be matched with the system frequency automatically.

A further object of my invention is the provision of a speed-matching system of the above indicated character in which hunting of the machine that is being matched will be prevented.

My invention will be better understood from the following description, when read in conjunction with the accompanying drawing in which the single figure is a diagrammatic view of apparatus and circuits employed in one preferred embodiment of my invention.

Referring to the drawing, a generator 2 is illustrated as comprising an armature winding 3 and a field winding 4 that is energized from any convenient source, such as an exciter generator 6. The field-winding circuit extends from one terminal of the exciter generator 6, through conductor 7, the field winding 4, conductor 8 and conductor 9, to the other terminal of the exciter generator 6. The armature winding 3 of the generator 2 is connected, by means of conductors 11, 12 and 13, and a circuit breaker 18 to the power conductors 15, 16 and 17, respectively. The circuit breaker 18 is provided for connecting the generator to, and disconnecting it from, the power-circuit conductors. Mechanism 19 for actuating the circuit breaker 18 is operated by an electromagnet 21. As the control of the electromagnet 21 forms no part of this invention, it is deemed unnecessary to illustrate or describe it.

The generator 2 is driven by a prime mover, such as a turbine 24, the speed of which is controlled by a governor mechanism 26 that controls the movement of a pivoted lever 27 and a valve 28 in the penstock or supply conduit 29, in accordance with the speed of the prime mover, to regulate the quantity of motive fluid supplied to the prime mover. The conduit 31 is provided for conducting the motive fluid away from the prime mover.

In order to vary the setting of the governor mechanism, to thereby adjust the predetermined speed of the prime mover that the governor mechanism will maintain, a spring 34 is employed. One end of the spring 34 is attached to the lever 27 and the other end is affixed to a threaded member 35 that is free to move vertically in an interiorly threaded gear wheel 36. When the gear wheel 36 is actuated, the member 35 moves upwardly or downwardly, thereby varying the tension of the spring 34, which determines the setting of the governor, that is, the amount of motive fluid which the governor will permit to enter the prime mover at a given prime-mover speed.

A motor 37, comprising an armature winding 38 and a field winding 39, is provided for actuating the gear wheel 36 to vary the tension of the spring 34. The field winding 39 is energized from the exciter generator 6, and the armature winding 38 is connected, by means of conductors 41 and 42, to movable contact arms 43 and 44, respectively, of the reversing switches 46 and 47.

The reversing switch 46 comprises the movable contact arm 43 and an electromagnet 48, the arm 43 carrying movable contact members 49 and 50 that cooperate, respectively, with stationary contact members 51 and 52. A biasing member 53 is provided for normally holding the cooperating contact members 50 and 52 in engagement. The reversing switch 47 is similar, in construction, to the switch 46 and comprises the movable contact arm 44 and an electromagnet 56, movable contact members 57 and 58 that cooperate with stationary contact members 59 and 60, respectively, and a biasing member 61 for normally holding the cooperating contact members 58 and 60 in engagement.

The stationary contact member 52 of the switch 46 is connected to one side of the exciter generator 6 by means of conductors 63 and 7. The stationary contact member 60 of the switch 47 is connected to the same side of the generator 6 by means of conductors 64, 65 and 7. The stationary contact members 51 and 59 of the reversing switches 46 and 47, respectively, are connected, by means of conductor 9, to the other side of the exciter generator 6 and are adapted to connect one side of the motor armature 38 to one side of the generator 6 upon the operation of one of the reversing switches to a second operative position and to connect the other side of the armature 38 to the same side of the generator 6 upon the operation of the other reversing switch to a second operative position.

When the electromagnets of the reversing switches 46 and 47 are unenergized, the switches are in the positions illustrated in the drawing to close a circuit from one side of the armature winding 38, through conductor 41, the contact arm 43 and the cooperating contact members 50 and 52 of the reversing switch 46, conductor 63, conductor 7, conductor 65, conductor 64, the cooperating contact members 60 and 58 and the contact arm 44 of the reversing switch 47 and conductor 42, to the other side of the armature winding 38, thus closing a dynamic-braking circuit for the motor 37.

Upon the operation of the one or the other of the reversing switches to its second operative position, the motor is so connected to the exciter generator 6 as to be operated in the one or the other direction. The operation of the switches 46 and 47 is controlled by a balanced torque-speed regulator 67.

The regulator 67 comprises a lever arm 68 pivoted at 69 and two centrifugal devices 71 and 72 that are attached to the lever 68 one on one side of the pivot 69. The centrifugal device 71 is driven by a synchronous motor 73 that is energized from the generator conductors 11, 12 and 13 by means of conductors 74, 75 and 76, respectively. The centrifugal device 72 is driven by a synchronous motor 78 that is energized from the power circuit conductors 15, 16 and 17 by means of conductors 81, 82 and 83, respectively.

As the speed of a synchronous motor is a function of the frequency of the voltage impressed upon it, the speed of the synchronous motor 78 is a function of the frequency of the voltage across the conductors 15, 16 and 17 or, in other words, the speed of the motor 78 will remain constant so long as the system frequency is constant. Conductors 15, 16 and 17 may then be considered a speed-reference means against which the speed of the generator 2 is matched.

The centrifugal device 71 comprises a frame member 84 that supports a movable centrifugal element 85 on a knife-edge bearing 86. Small fly-balls 87 and 88 are attached to the centrifugal element 85 and, as the speed of the centrifugal device changes, the raising or lowering of the fly-balls produce a torque which is transmitted to the levers 68 through a bearing 89. The centrifugal device 72 is similar in construction to the device 71 and comprises a frame member 91, a centrifugal element 92 mounted on a knife-edge bearing 93, fly-balls 94 and 95 and a bearing 96 through which the movement of the centrifugal element is transmitted to the lever arm 68.

The lever arm 68 carries movable contact members 97 and 98 that cooperate with contact members 101 and 102, respectively. The contact members 101 and 102 are carried by pivoted members 103 and 104, respectively, and biasing members 105 and 106 are attached to the pivoted members 103 and 104, respectively, to normally hold the cooperating pairs of contact members out of engagement. A dash pot 107 is provided to stabilize the lever system. Adjustable springs 108 and 109 are provided in order that the sensitivity of the regulator may be adjusted.

Upon engagement of the contact members 97 and 101, a circuit is completed through the operating winding of the electromagnet 48 to actuate the switch 46 to its second operative position. Upon the engagement of the contact members 98 and 102, a circuit is completed, through the operating winding of the electromagnet 56, to actuate the switch 47 to its second operative position.

To enable the regulator to produce a corrective action in proportion to the error in the speed of the generator 2, means are provided for making the length of time of engagement of the contact members vary according to the magnitude of the error. To this end, a synchronous motor 110 is provided that is energized from the conductors 15, 16 and 17 to drive a plurality of meshed gears 111, 112, 113 and 114 through a worm gear 115. Cams 117 and 118 are driven by the gears 111 and 114, respectively, and engage the pivoted members 103 and 104, respectively. By these means, the contact members 101 and 102 are made to oscillate up and down and, when the contact members 97 and 98 are deflected, the time of their engagement with their cooperating contact member is a function of the magnitude of the error in the speed of the generator 2 from the desired speed.

The operation of my system is as follows: When the speed of the generator 2 is such that the frequency of the generated voltage is the same as the frequency of the voltage across the conductors 15, 16 and 17, the synchronous motors 73 and 78 are operating at the same speed, the torques produced by the centrifugal devices 71 and 72 are equal, the lever arm 68 is in a balanced neutral position and the circuit breaker 18 may be closed to connect the generator 2 to the conductors 15, 16 and 17.

Should the speed of the generator 2 be below that required to generate voltage of the same frequency as the voltage across the conductors 15, 16 and 17, the speed of the centrifugal device 71 is lower, thus producing less torque to transmit to the lever arm 68. The centrifugal device 72, exerting a greater torque than the centrifugal device 71, the right-hand end of the lever arm 68 is forced upwardly to effect engagement of the contact members 97 and 101, thereby establishing a circuit, through the operating winding of the electromagnet 48, to operate the switch 46 to its second operative position.

The operating circuit for the electromagnet 48 may be traced from one terminal of the generator 6, through conductor 9, conductor 121, lever arm 68, contact members 97 and 103, conductor 122, the operating winding of the electromagnet 48, conductor 123, the contact member 52 of the switch 46, conductor 63 and conductor 7, to the other terminal of the generator 6.

The reversing switch 46, when actuated to its second operative position, separates the contact members 50 and 52 and causes engagement of the contact members 49 and 51, thereby completing a circuit through the armature winding 38 of the motor 37, causing the motor 37 to operate in a direction to increase the tension of the spring 34 to increase the input of motive fluid through the turbine, thereby increasing the speed of the generator 2. The motor-operating circuit may be traced from one terminal of the generator 6, through conductor 9, conductor 124, contact members 49 and 51 and the arm 43 of the reversing switch 46, conductor 41, armature winding 38, conductor 42, the arm 44 and the contact members 58 and 60 of the reversing switch 47, conductor 64, conductor 65 and conductor 7, to the other terminal of the generator 6.

If the variation in the speed of the generator 2 is small, the contact members 97 and 101 will be held in engagement by the action of the cam 117 for a short period of time. If, however, the speed variation is large, the contact members 97 and 101 are held in engagement for a longer period of time to secure the required corrective action.

In case the speed of the generator 2 is above that required to generate voltage of the same frequency as the voltage across the conductors 15, 16 and 17, the torque produced by the centrifugal device 71 will be greater than the torque produced by the centrifugal device 72, and the left-hand end of the lever arm 68 will be moved upwardly, thereby effecting engagement of the contact members 98 and 102, and establishing a circuit through the operating winding of the electromagnet 56, to operate the switch 47 to its second operative position.

The circuit for operating the electromagnet 56 may be traced from one terminal of the generator 6, through conductor 9, conductor 121, lever arm 68, the contact members 98 and 102, conductor 126, the operating winding of the electromagnet 56, conductor 127, contact member 60 of the reversing switch 47, conductor 64, conductor 65, and conductor 7, to the other terminal of the generator 6.

The reversing switch 47, when actuated to its second operative position, disengages the contact members 58 and 60 and causes engagement of the contact members 57 and 59 to complete a circuit for operating the motor 37 in a direction opposite to that previously described. The motor circuit may be traced from one terminal of the generator 6, through conductor 9, conductor 128, contact members 57 and 59 and the arm 44 of the reversing switch 47, conductor 42, the armature winding 38, conductor 41, the arm 43 and the contact members 50 and 52 of the reversing switch 46, conductor 63 and conductor 7, to the other terminal of the generator 6.

The motor 37 is, therefore, caused to operate in a direction to decrease the tension of the spring 34, thereby causing a decrease in the input to the turbine and decreasing the speed of the generator 2. The contact members 98 and 102 of the regulator 67 are held in engagement by the action of the cam 118 for a period long enough to effect the required direction.

While I have described my invention as applied to matching the speed of an alternating-current generator with the frequency of a power system, it will be appreciated that it is applicable to matching the speed of any dynamo-electric machine with a speed-reference means.

Since modifications may be made in the apparatus and circuits described without departing from the spirit of my invention, I do not wish to be limited otherwise than by the scope of the appended claims.

I claim as my invention:

1. In a speed-matching system, in combination, a dynamo-electric machine, a speed-reference means associated with the dynamo-electric machine, means for controlling the speed of the dynamo-electric machine comprising two centrifugal devices operated, respectively, in accordance with the speed-reference means and the speed of the dynamo-electric machine, means responsive to the two centrifugal devices for actuating means to operate the speed-varying means.

2. In a speed-matching system, in combination, a dynamo-electric machine, a speed-reference means associated therewith, means for controlling the speed of the dynamo-electric machine, an electric motor for controlling the speed-control means, contact members for controlling the operation of the motor, two centrifugal devices having speeds that are, respectively, proportional to the speed-reference means and the speed of the dynamo-electric machine, and means responsive to the two centrifugal devices for causing the engagement of the contact members and the operation of the motor.

3. In a speed-matching system, in combination, a dynamo-electric machine, a speed reference means associated therewith, means for controlling the speed of the dynamo-electric machine, an electric motor for controlling the speed-control means, contact members for controlling the operation of the motor, two centrifugal devices having speeds that are, respectively, proportional to the speed-reference means and the speed of the dynamo-electric machine, means responsive to the two centrifugal devices for controlling the contact members and means for making the time of contact engagement proportional to the variation in the speed of the dynamo-electric machine from the speed-reference means.

4. In combination, a source of alternating current, a prime mover, an electrical generator driven thereby and adapted to be connected in parallel-circuit relation to said source, a speed governor for controlling said prime mover, two centrifugal devices, the speed of one centrifugal device being in accordance with the speed of the generator, and the speed of the other centrifugal device being in accordance with the frequency of said source, and means controlled by said centrifugal devices and actuated, when the speeds of the two devices are unequal, to actuate means for so changing the setting of the governor and the speed of the generator that the frequency of the generated voltage is equal to the frequency of the source.

5. In combination, an electric circuit, a prime mover, an electric generator driven thereby, a speed governor for controlling said prime mover, means for varying the setting of said governor comprising an electroresponsive device, contact members for controlling the operation of the electroresponsive device, and two centrifugal devices operated, respectively, in accordance with the frequency of the generator and the electric circuit for controlling the operation of said contact members.

6. In combination, an electric circuit, a prime mover, an electric generator driven by said prime mover and adapted to be connected to the electric circuit, a speed governor for controlling the prime mover, means for varying the setting of said governor, contact members for controlling the operation of the governor-setting varying means, a pivoted device for carrying certain of said contact members, two rotating centrifugal devices rotating, respectively, in accordance with the frequencies of the generator and the electric circuit, and means for translating the motion of the respective rotatable devices into opposing forces on the pivoted device, the pivoted device holding the contact members out of engagement when the two frequencies are substantially equal.

7. In combination, an electric circuit, a prime mover, an electric generator driven by said prime mover and adapted to be connected to the electric circuit, a speed governor for controlling the prime mover, means for varying the setting of the governor, a motor for actuating the governor-setting varying means, means for actuating the motor comprising a pivoted device carrying contact members, contact members cooperating therewith, means comprising centrifugal devices for impressing opposing forces on the pivoted device respectively proportional to the frequencies of the generator and the circuit, the cooperating pairs of contact members engaging to complete a circuit through the motor when the two frequencies are unequal, and means for preventing hunting of the generator.

8. In combination, an electric circuit, a prime mover, an electric generator driven by said prime mover and adapted to be connected to the electric circuit, a speed governor for controlling the prime mover, means for varying the setting of the governor, a motor for actuating the governor-setting varying means, means for actuating the motor comprising a pivoted device carrying contact members, contact members cooperating therewith, means comprising centrifugal devices for impressing opposing forces on the pivoted device that are proportional, respectively, to the frequencies of the generator and of the circuit, cooperating pairs of contact members engaging and completing a circuit through the motor when the two frequencies are unequal, and means for making the time of contact engagement proportional to the difference in the frequencies.

9. In a speed-matching system, in combination, a dynamo-electric machine, a speed-reference means associated with the dynamo-electric machine, two centrifugal devices operated, respectively, in accordance with the speed of the speed-reference means and the speed of the dynamo-electric machine, electroresponsive means for varying the speed of the dynamo-electric machine, means comprising pairs of cooperating contact members for controlling said electroresponsive means, one contact member of each pair being actuated in response to the two centrifugal devices and means for intermittently varying the position of the other contact member of each pair.

10. In a speed-matching system, in combination, a dynamo-electric machine, a speed-reference means associated with the dynamo-electric machine, two centrifugal devices operated, respectively, in accordance with the speed of the speed-reference means and the speed of the dynamo-electric machine, electroresponsive means for varying the speed of the dynamo-electric machine, means comprising pairs of cooperating contact members for controlling said electroresponsive means, one contact member of each pair being actuated in response to the two centrifugal devices, and means for oscillating the other contact member of each pair in a direction toward and away from its cooperating contact member to thereby vary the time of engagement of the cooperating contact members in accordance with the magnitude of error in the speed of the dynamo-electric machine.

In testimony whereof, I have hereunto subscribed my name this 26th day of July 1930.

JOHN H. ASHBAUGH.